United States Patent [19]

Sundblad et al.

[11] Patent Number: 5,061,471
[45] Date of Patent: Oct. 29, 1991

[54] PROCESS FOR THE PRODUCTION OF CHLORINE DIOXIDE

[75] Inventors: Birgitta Sundblad, Sundsval, Sweden; David C. Lovetro, Marietta, Ga.

[73] Assignee: Eka Nobel AB, Surte, Sweden

[21] Appl. No.: 514,539

[22] Filed: Apr. 26, 1990

[51] Int. Cl.$^5$ ............................................. C01B 11/02
[52] U.S. Cl. ................................................ 423/480
[58] Field of Search ..................................... 423/480

[56] References Cited

U.S. PATENT DOCUMENTS

| | | | |
|---|---|---|---|
| 2,895,801 | 7/1959 | Northgraves et al. | 423/480 |
| 4,451,444 | 5/1984 | Santillie et al. | 423/480 |
| 4,534,952 | 8/1985 | Rapson et al. | 423/478 |

FOREIGN PATENT DOCUMENTS

| | | | |
|---|---|---|---|
| 565750 | 11/1958 | Canada | 423/480 |
| 275246 | 1/1988 | European Pat. Off. | 423/480 |
| 2167694 | 5/1983 | United Kingdom | 423/480 |

OTHER PUBLICATIONS

Masschelein, W. J., "Chlorine Dioxide", Ann Arbor, Mich., 1979, pp. 118–119.

*Primary Examiner*—Michael L. Lewis
*Assistant Examiner*—Brian M. Bolam
*Attorney, Agent, or Firm*—Burns, Doane, Swecker & Mathis

[57] ABSTRACT

A process for a continuous production of chlorine dioxide in a cooled reaction vessel subjected to an overpressure, comprising continuous addition of an aqueous solution of an alkali metal chlorate, sulfuric acid and sulfur dioxide to the reaction vessel in proportions to generate chlorine dioxide at a temperature from about 30° to about 60° C. and at an acidity of about 5 to about 11 N. The reaction solution containing dissolved chlorine dioxide is continuously withdrawn. At the start up of the process the reaction vessel is filled with the water solution of alkali metal chlorate, optionally containing alkali metal chloride, and the sulphuric acid with a feed concentration of from about 20 to about 60 percent by weight whereafter the flows are adjusted to correspond to the production rate. Finally sulfuric dioxide is added so slowly that no gas phase is formed and the sulphuric acid flow is slowly increased until the suitable flow for the chosen production is reached.

9 Claims, 1 Drawing Sheet

PROCESS FOR THE PRODUCTION OF CHLORINE DIOXIDE

The present invention relates to a process for the production of chlorine dioxide in a small scale chlorine dioxide generator. More precisely the invention relates to an improved start up process for a small scale chlorine dioxide generator.

Chlorine dioxide used as an aqueous solution is of a considerable commercial interest, mainly in pulp bleaching but also in a number of microbiocidal applications especially in the field of water treatment and odor abatement. It is therefore desirable to provide processes by which chlorine dioxide can be efficiently produced.

There are several problems connected with the production of chlorine dioxide. Gaseous chlorine dioxide is very unstable and decomposes explosively. Therefore chlorine dioxide is usually produced "on site" in stead of at a plant and then transported to the place where it is used.

The state of the art discloses a great variety of different types of chlorine dioxide production methods in which the generators mostly consist of large processing apparatus comprising elongated columns as reaction vessels. The reactants are introduced into the vessel where they are allowed to react to produce chlorine dioxide which is usually removed as a gas. However, for some of the technical fields such as water treatment there is a great interest for a small unit. It is common use to treat drinking water in a small apparatus with chlorite as the chlorine dioxide source, but this method is expensive.

There are many methods of producing chlorine dioxide. Usually alkali metal chlorate is reduced with a suitable reducing agent in an acidic water solution and gaseous chlorine dioxide is taken out from the reaction zone. The partial pressure of chlorine dioxide is kept low to prevent decomposition of the chlorine dioxide. The chlorine dioxide gas is then dissolved in water for later use or directly in the water to be treated.

As a reducing agent chloride ions, methanol and sulfur dioxide are used. When chloride ions are used half a mole of chlorine is produced for each mole of chlorine dioxide. Chlorine dioxide mixed with high amounts of chlorine is not suitable for water treatment as chlorine reacts with the organic material being present in the water to produce chlorinated organic compounds. The most suitable reducing agent for chlorine dioxide production for water treatment is sulfur dioxide. Little or no chlorine is produced with sulfur dioxide as the reducing agent.

Sulfur dioxide is a slow reducing agent for chlorate but a good chlorine reducer, which means that $SO_2$ works as an indirect reducing agent creating chloride ions according to the following reaction:

$$SO_2 + Cl_2 + 2H_2O \rightarrow H_2SO_4 + 2HCl \quad (1)$$

Formed chloride ions participate in the chlorine dioxide formation as follows:

$$2NaClO_3 + 2HCl + 2H_2SO_4 \rightarrow 2ClO_2 + Cl_2 + 2NaHSO_4 + 2H_2O \quad (2)$$

The balanced total reaction can be summarized as follows:

$$2NaClO_3 + SO_2 + H_2SO_4 \rightarrow 2ClO_2 + 2NaHSO_4 \quad (3)$$

and this is the main reaction. There will also be a side reaction with the net formula:

$$NaClO_3 + 3SO_2 + 3H_2O \rightarrow 2H_2SO_4 + HCl + NaHSO_4 \quad (4)$$

There will also be a risk for reaction of $SO_2$ with formed $ClO_2$:

$$2ClO_2 + 5SO_2 + 6H_2O \rightarrow 2HCl + 5H_2SO_4$$

which also will lower the chlorine dioxide yield.

The reason for the chlorine dioxide generators often being large and bulky is that a large vessel is required to provide sufficient reaction volume for the liberation of the formed chlorine dioxide gas. Using $SO_2$ as the reducing agent also requires a certain residence time in the generator for the dissolution of it and for contact with the dissolved reactants.

EP patent application no. 88850011.3 discloses a small scale generator for chlorine dioxide production. With this generator it has been possible to produce chlorine dioxide, from alkali metal chlorate and $SO_2$, efficiently in a small scale generator. EP application no. 88850011.3 is hereby incorporated by reference.

The generator according to EP no. 88850011.3 comprises an enclosed reaction vessel, of unusually small size, for housing a liquid reaction medium. The vessel has a means for introducing a liquid reactant and a means for introducing a gaseous or liquid reducing agent. There is also an outlet means for removing the product. The generator is operated under a high pressure.

With the improved chlorine dioxide generator according to EP no. 88850011.3 it was possible to produce chlorine dioxide from alkali metal chlorate in a small scale generator on site. By creating a highly pressurized system it was possible to produce liquid chlorine dioxide of a high concentration. However, it appeared that due to the reduced size of the equipment, control problems were obtained. Sometimes during the beginning of the operation, before a steady state had been reached, a sudden temperature rise could occur which could be from about 25° C. to about 140° C. in a few seconds. If the pressure is lost or the temperature increases suddenly gas bubbles will form. As the chlorine dioxide decomposes so easily, decomposition starts immediately upon the formation of gas bubbles and explosion follows the decomposition.

BRIEF DESCRIPTION OF THE DRAWING

For a full understanding of the invention, the following detailed description should be read in conjunction with the drawing, wherein the single FIGURE illustrates one embodiment of the chlorine dioxide generator used in the process of the present invention.

DETAILED DESCRIPTION OF THE PREFERRED EMBODIMENTS

Figure 1:
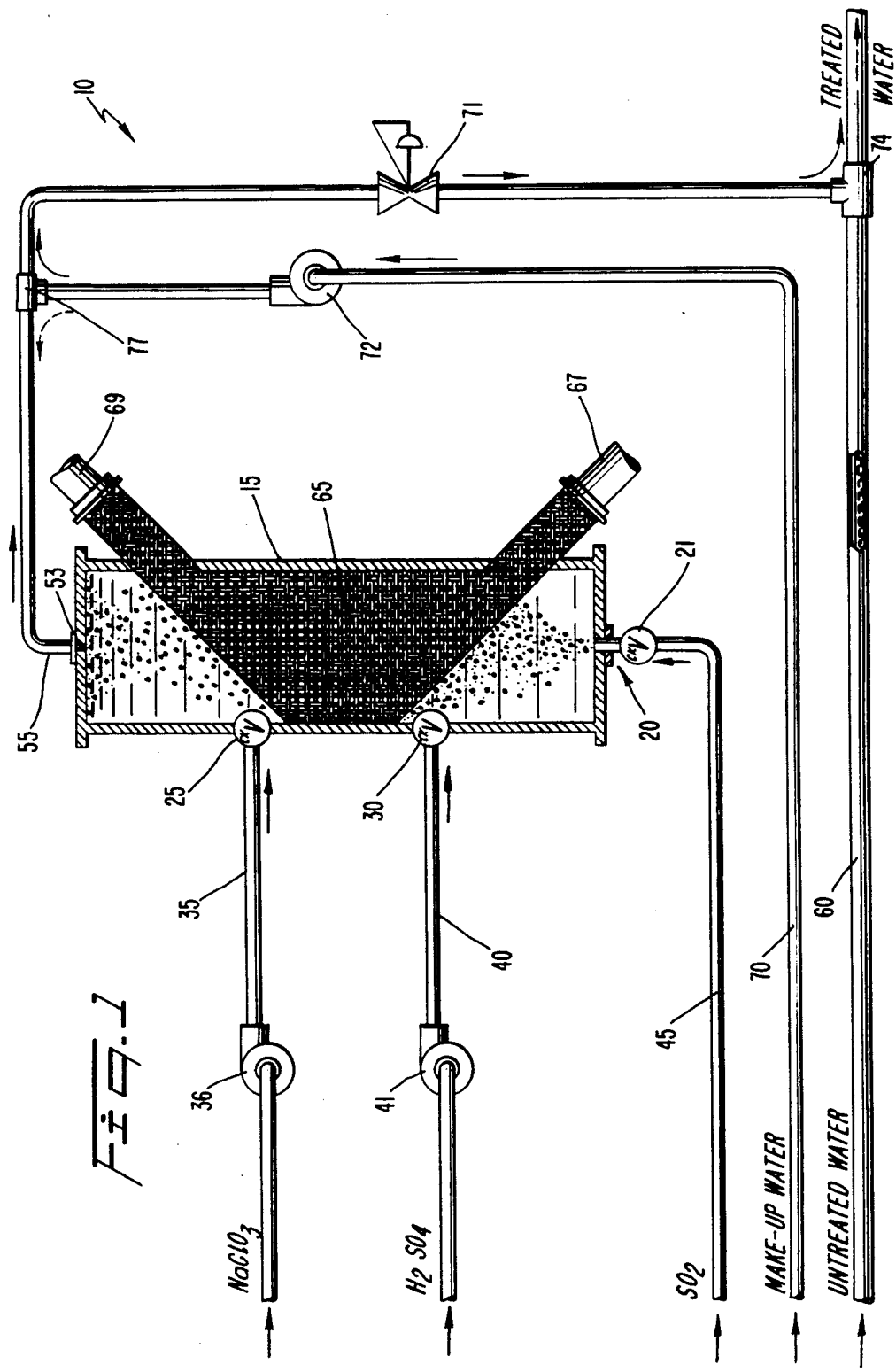

The present invention, as it appears from the claims, relates to an improved manner of producing chlorine dioxide in a small scale generator from alkali metal chlorate with $SO_2$ as the reducing agent in an acidic medium. It was surprisingly found that if the reaction in the generator was started in a special manner the control problems could be solved. It has been found that if the reaction system in the generator became instable, due to the formation of a gas phase, it was not possible to come back to stable conditions without closing down the reaction and start again. Surprisingly it was found that if the start up of the process was done in a prescribed order with the right concentration of the constituents the reaction could be run smoothly without decomposition for a long time.

The new start up procedure according to the present invention comprises the following steps: The reaction vessel is fed with a water solution of alkali metal chlorate, preferably containing a small amount of alkali metal chloride. Then sulphuric acid with a concentration of less or equal of 60 per cent by weight is added and the temperature is adjusted to 30-60° C., preferably to 35-40° C. The flows of alkali metal chlorate and sulphuric acid are adjusted to correspond to the chosen production rate. After that the sulphur dioxide is fed so slowly that no gas phase is formed. A suitable way of controlling that no gas phase is formed is by measuring the rise of the temperature in the media. It has been found that for a safe run of the reaction the rise of temperature should not at any time or point exceed 10° C. preferably not 5° C. The slow addition of sulphur dioxide is continued and slowly increased until such a flow of the sulphur dioxide is reached at which the amount of the reducing agent is the suitable one with regard to the added amount of chlorate and the chosen production. When the desired flow of reducing agent is reached and thus the start up procedure completed the flows of the reactants are added continuously to the reaction vessel.

The use of $SO_2$ as the reducing agent results in an exothermic reaction, i.e. heat of formation is liberated. A good cooling is therefore important. However, even with a satisfactory cooling system so called hot spots, where the temperature suddenly rises, easily appears. Especially when the reaction starts, excess chlorate has been built up in the generator and can cause a sudden rise in temperature. Due to hot spots the reaction easily gets out of control with decomposition as a consequence and explosion as a risk. When decomposition once has started it is not possible to get back into stable conditions. The formation of a tiny gas bubble can be sufficient to cause decomposition. By following the start up procedure of the present invention it was possible to run the generator steadily without decomposition for a long time with a good efficiency and conversion.

The order of addition of the constituents in the start up procedure is important. It was found that it was possible neither to start with $SO_2$ and acid and then add chlorate and salt, nor to start with $SO_2$ and chlorate solution and add acid. With both these combinations there will be a risk for decomposition and control problems. It is also essential that $SO_2$ is added slowly during the start up procedure. In this way sudden rises in temperature and thus the risk for the formation of a gas phase, can be avoided. The amount of added $SO_2$ is carefully controlled, as well as the temperature, until the addition of the amount of $SO_2$ has reached the value that is needed for the used amount of chlorate.

It has also been found that it is important to use an acid with a concentration from about 20 to about 60 per cent by weight, preferably between about 30 to about 50 per cent by weight and most preferably 50 per cent by weight. If a more concentrated acid is used it is difficult to reach stable conditions.

To be able to obtain a good yield the acidity of the solution and the temperature in the generator are important factors It is suitable to have an acidity from about 5 to about 11N, preferably between 8-10N and keep the temperature in the range of from about 30° to about 60° C., preferably between 35-40° C.

Due to the generator being a tube reactor and all products moving out from the reaction zone there can be a deficiency of chloride ions. Even if $SO_2$ does react with chlorine formed to produce chloride ions this reaction will not take place in the reaction zone but after. Therefore it may be suitable to add small amounts of alkali metal chloride together with the chlorate. The amount of alkali metal chloride in the solution may suitably be from about 0.1 to about 10 per cent by weight of the feed solution, preferably about 0.1 to about 5 per cent by weight.

The concentration of alkali metal chlorate in the aqueous feed solution may vary from 200-700 gpl, preferably from 250-350 gpl. It is possible to use chlorate of all the alkali metals but it is preferred to use sodium chlorate.

The reaction is run at an overpressure. Suitably the pressure will be in the range of from 2 to 7 bar, preferably between 4 and 6 bar.

The small scale chlorine dioxide generator used in the present invention may comprise a distribution means for $SO_2$ in the bottom of the reaction vessel. $SO_2$ can be introduced both as a liquid or as a gas through the distribution means. The distribution means comprises a porous plate which breaks the gas or liquid into extremely fine bubbles or droplets, thereby enhancing the dissolution of the sulfur dioxide in the aqueous reaction medium. The gas bubbles obtained by feeding the sulfur dioxide gas through the porous plate are so tiny that immediately upon entering the reaction vessel the bubbles dissolve in the liquid medium. The porous plate can be of e.g. fluorocarbon or graphite.

Chlorate solution is introduced into the reaction vessel through a liquid inlet located in the middle of the vessel. Sulphuric acid is fed through an inlet located below the chlorate inlet, preferably near the bottom of the vessel. Both the sulfuric acid and the chlorate solution are added by means of a distributor to obtain an even distribution in the media as quickly as possible. The reaction vessel also comprises a cooling water tube inside the vessel. The tube can be in the form of a bundle and thereby not only cool the reaction medium but also provide a tortuous path for the sulfur dioxide thereby retarding the sulfur dioxide and allowing increased contact with the dissolved reactants.

The generator is operated under a high pressure which will keep formed chlorine dioxide and chlorine as well as fed sulphur dioxide in a dissolved or liquid state. This will make it possible to produce highly concentrated chlorine dioxide without decomposition. Because the chlorine dioxide isn't handled in a separate gas phase, the unit equipment is smaller and more simple.

The preferred method of providing the elevated pressure is by pumping water from the untreated water supply to the vicinity of the generator through a back pressure control device to maintain a suitable back pressure on the water stream. The product outlet connection at the top of the reaction chamber is directly connected to this pressurized water line, causing a similar back pressure to be developed in both the water piping and the reaction vessel. The reactor effluent with the chlorine dioxide dissolved therein is immediately mixed with this pressurized water stream to further promote chlorine dioxide solubility. The pressurized stream of water with the chlorine dioxide dissolved therein is then injected into the main stream of water to be treated.

A suitable small scale generator for the present invention is described in EP 88850011.3. A preferred embodiment of this generator is illustrated in the enclosed figure. The generator indicated generally by the number (10), comprises a columnar cylindrical reaction vessel (15) containing a braided teflon cooling Coil (65). The coil (65) is loosely packed into the reaction vessel to fill the cross-section thereof. A cooling liquid, preferably water, can be circulated through the coil via fittings (67) and (69). Sulfur dioxide, in gaseous or liquid form, is fed along a pipe (45) to a check valve (21) and into the reaction chamber (15) at inlet (20) through a porous media at the bottom of the reaction vessel to enhance the dissolution of the reducing agent in the medium and to avoid gas bubbles of sulfur dioxide in the reaction vessel.

The pressure in the vessel is adjusted so that $SO_2$ is in the liquid phase in the vessel. The pressure in the reaction vessel is maintained by pumping untreated water through pipe (70) by pump (72) into pipe (55) at inlet (77). Pumping untreated water in this manner provides a back pressure into reaction vessel (15). Pressure in the reaction vessel is regulated by a back pressure control device (71). The pressure in the reaction chamber must be great enough to keep all of the chlorine dioxide produced in the vessel in solution.

Aqueous solutions of sodium chlorate and sulfuric acid are pumped to the reaction vessel via pipes (35) and (40) by suitable metering pumps (36) and (41) and terminating in the inlets (25) and (30), respectively. It is to be understood that it is not critical where inlets (25) and (30) are located on the reaction vessel. However, in the preferred embodiment, the inlet through which the acid is introduced should be located near the bottom of the reaction vessel, below the chlorate solution inlet and the inlet through which the chlorate solution is introduced should be located a sufficient distance above the acid inlet so that the acid is substantially fully diluted with the reaction medium before contacting the chlorate solution. Thus, the acid solution is immediately placed in contact with the dissolved sulfur dioxide as it is introduced into the vessel. The acid-sulfur dioxide solution then comes into contact with the chlorate solution.

At the top of reaction vessel (15) is an outlet (53) for removing the solution of chlorine dioxide via pipe (55). After a residence time at least sufficient to effect substantially complete reaction of the sulfur dioxide in the reaction vessel, the chlorine dioxide solution is transported to pipe (60) which carries untreated water. The chlorine dioxide solution is then injected into the untreated water stream at (74). The residence time is controlled by the rate of introduction of the sodium chlorate/sulfuric acid solutions.

To illustrate the invention the following example was run in which by parts and per cent are meant parts and per cent by weight if nothing else is said:

EXAMPLE

A reaction vessel was filled with water and $H_2SO_4$ until totally filled and an overpressure of 6 bar was maintained. Then the water was substituted with chlorate solution containing 300 gpl of $NaClO_3$ and 20 gpl of NaCl. The flows were adjusted to 10 ml of $NaClO_3$ solution/min and 12.5 ml of $H_2SO_4$ (50%)/min. Small amounts of $ClO_2$ starts to form. Then liquid $SO_2$, constituting the real reducing agent, is added very slowly under a strict temperature control. The rise of the temperature is not allowed to exceed 5° C. The temperature in the reactor was 40° C. After a while the required flow of 1.29 g/min of $SO_2$ is obtained. With this start up procedure it was possible to run the generator continuously without decompositions for a long time. The reactor solution was removed from the reaction vessel at a rate of 1.35 l/h and containing 80 g/l of dissolved $ClO_2$ and discharged into the cold water system.

COMPARABLE EXAMPLE 1

A reaction vessel was filled with water and $H_2SO_4$ in the same way and with the same overpressure as in the first example. The water was substituted with a chlorate solution containing 650 gpl of $NaClO_3$ and 43 gpl of NaCl. The flows were adjusted to 4.6 ml of $NaClO_3$ solution/min and 6.7 ml/min of $H_2SO_4$ of 93 weight %. The reducing agent $SO_2$ was fed as a liquid. After a short operation period a sudden temperature increase occurred, from 25° C. to 140° C. in a few seconds. Decomposition started and was immediately followed by an explosion.

COMPARABLE EXAMPLE 2

A reaction vessel was filled with water and $H_2SO_4$ in the same way and with the same overpressure as in the first example. The feed of reducing agent, liquid $SO_2$, was started and slowly brought to the required flow of 1.29 g/min. Thereafter the chlorate feed consisting of 300 gpl solution of chlorate with 20 gpl NaCl was slowly added. Almost immediately a continuous decomposition started which could be heard as a steady knocking from generator inside. The chlorate feed was turned of but after a few minutes an explosion was a fact.

We claim:

1. A process for continuous production of chlorine dioxide in a cooled reaction vessel subjected to an overpressure, comprising continuously adding an aqueous solution of an alkali metal chlorate, sulfuric acid and sulfur dioxide to the reaction vessel in proportions to generate chlorine dioxide at a temperature of from about 30° to about 60° C. and at an acidity of from about 5 to about 11N, thereby forming a reaction solution containing dissolved chlorine dioxide, and continuously withdrawing the reaction solution containing dissolved chlorine dioxide, wherein the start up of the process includes the steps of totally filling the reaction vessel with an aqueous solution of alkali metal chlorate, and sulfuric acid at a feed concentration of from about 20 to about 60 percent by weight, adjusting the flows of said alkali metal chlorate and said sulfuric acid to correspond to a desired production rate, thereafter feeding sulfur dioxide to the reaction vessel in a manner and at a flow rate low enough that no gas phase is formed, and slowly increasing the sulfur dioxide flow until a flow rate is reached corresponding to said desired production rate.

2. A process according to claim 1, wherein the concentration of sulfuric acid is from about 30 to about 50 per cent by weight.

3. A process according to claim 1, wherein the aqueous solution of alkali metal chlorate contains alkali metal chloride.

4. A process according to claim 3 wherein the amount of alkali metal chloride is from about 1 to about 10 per cent by weight of the feed solution of alkali metal chlorate and alkali metal chloride.

5. A process according to claim 1, wherein the absence of a gas phase is controlled by measuring the rise of temperature in the reaction solution.

6. A process according to claim 5 wherein the rise in temperature does not exceed 10° C.

7. A process according to claim 1, wherein the residence time for the reaction solution in the reaction vessel is sufficient to effect substantially complete reaction of the sulfur dioxide in the reaction vessel.

8. A process according to claim 1, wherein the overpressure in the reaction vessel is a static head overpressure between about 2 and about 7 bar.

9. A process according to claim 1, wherein the formation of a gas phase in the reaction vessel is a function of temperature rise in the reaction vessel, and wherein the step of increasing the sulfur dioxide feed rate from said initial rate includes monitoring the temperature rise in the reaction vessel and adjusting the rate of increase in the sulfur dioxide feed rate to prevent the temperature rise from exceeding 10° C., thereby preventing the formation of said gas phase.

* * * * *